W. P. CARSON & J. J. HUBBARD.
GRINDING MILL.
APPLICATION FILED OCT. 4, 1911.

1,028,839.

Patented June 4, 1912.

Witnesses
W. A. Williams
E. R. Peck

Inventors
W. P. Carson
J. J. Hubbard
By Hubert Peck Attorney

W. P. CARSON & J. J. HUBBARD.
GRINDING MILL.
APPLICATION FILED OCT. 4, 1911.

1,028,839.

Patented June 4, 1912.

W. P. CARSON & J. J. HUBBARD.
GRINDING MILL.
APPLICATION FILED OCT. 4, 1911.

1,028,839.

Patented June 4, 1912.

Witnesses
W. A. Williams
E. R. Peck

Inventors
W. P. Carson
J. J. Hubbard
By Hubert E. Peck
Attorney

UNITED STATES PATENT OFFICE.

WILFRED P. CARSON AND JOHN J. HUBBARD, OF TAYLORSVILLE, NORTH CAROLINA, ASSIGNORS TO CARSON-HUBBARD MILL COMPANY, OF TAYLORSVILLE, NORTH CAROLINA, A CORPORATION OF NORTH CAROLINA.

GRINDING-MILL.

1,028,839.  Specification of Letters Patent.  Patented June 4, 1912.

Application filed October 4, 1911. Serial No. 652,808.

*To all whom it may concern:*

Be it known that we, WILFRED P. CARSON and JOHN J. HUBBARD, citizens of the United States, residing at Taylorsville, Alexander county, North Carolina, have invented certain new and useful Improvements in Grinding-Mills; and we do hereby declare the following to be a full, clear, and exact description of the invention, such as will enable others skilled in the art to which it appertains to make and use the same.

This invention relates to certain improvements in grist or corn mills, and the like, and the objects and nature of the invention will be readily understood by those skilled in the art in the light of the following explanation of the accompanying drawings illustrating what we now consider to be our preferred embodiments from among other constructions and arrangements within the spirit and scope of the invention.

The invention consists in certain novel features in construction and in combinations and arrangements as more fully and particularly set forth hereinafter.

Referring to the accompanying drawings.

The mill disclosed in the drawings is mounted on and carried by longitudinal bed beams 1, and upright head blocks or pillars 10, 11, 12, are arranged transversely of said beams and the blocks 10, and 11, rigidly bolted or otherwise strongly fixed thereto. The horizontal longitudinal shaft or spindle 2, of the mill is arranged transversely of said blocks and is mounted in suitable journal boxes fixed thereon and carried thereby.

The vertically arranged case or inclosure of the mill that contains the grinding elements, disks, burs or stones is located on the beams 1, and between the head blocks 11, 12, and is composed of two parallel vertical transverse sections normally rigidly bolted together and to said head blocks and rigidly fixed to the bed beams. One of these sections contains the runner bur and the other the bed bur, and the arrangement is such, as hereinafter set forth, that the section containing the bed bur can be readily released and removed from the mill, to give access to the burs, or for other reasons. The section $a$, inclosing the runner bur A, is in the form of a rectangular box open at the inner side and composed of top, bottom and side bars and an outer end wall all rigidly bolted and secured together and to the head block 11. The fixed section thus formed is rigidly secured to the bed beams by any suitable means or in any suitable manner as by vertical bolts $a'$, preferably to form a fixed or permanent part of the mill frame work or structure. The other or removable section $b$, inclosing and carrying the bed bur or stone B, is likewise approximately of the form of a rectangular box open at the inner side and composed of top, bottom, and side bars and an outer end wall usually comprising head block 12, all rigidly bolted or otherwise secured together and removably resting on the bed beams and longitudinally removable therefrom.

The section $b$, is removably secured in position with respect to section $a$, so that the inner vertical edges of said sections around the open sides or ends thereof properly abut to form the desired casing about the burs. Various means can be employed for this purpose, although in the drawings we show the two sections clamped together by long removable bolts 13, passed transversely through the sections exteriorly of the burs, therein, the sections being formed with transverse bolt holes 14, to removably receive such bolts.

15, are rigid heavy upright angle braces arranged at the outer end or side of the section $a$, and fixed to and rising from a rigid part of the frame to prevent outward springing of the section $a$, when the clamping bolts 13, are excessively tightened and the sections $a$, $b$, are under too much tension. Under such conditions, the upper portion of the section $a$, would tend to spring back permitting the burs to approach too closely at their upper portion for even grinding and wear. These rigid braces fixed to the upper portion of section $a$, so brace and increase the rigidity of such section as to maintain the burs in proper relative parallel positions.

The bed bur B, is fixed and rigidly secured in section $b$, in any suitable manner. For instance, we show the same set in a bed of cement $b'$, that fills the section around and behind the stone, leaving only the dressed face thereof exposed. This bed stone is formed with an enlarged center eye or opening extending longitudinally therethrough, and in this eye an elongated metal sleeve 15, is longitudinally fitted and secured to form a grain feed passage and screw conveyer casing. This sleeve is internally cylindrical and is open at its inner end to deliver the grain between the burs. The sleeve extends outwardly beyond the bur B and to the exterior of section $b$, and at the exterior of said section is formed with a top vertical grain receiving opening 15', preferably surrounded by an upwardly projecting vertical neck, while the outer end of the conveyer casing or sleeve is closed by vertical end wall 15". The shaft or spindle 2, passes centrally and longitudinally through said sleeve 15, and is provided with a worm or screw conveyer 20, arranged in said sleeve and extending approximately throughout the length thereof. This screw is arranged longitudinally of and exteriorly of said shaft and is fixed thereon, and is arranged to constantly force the grain longitudinally through said sleeve and into the center space between the burs, whereby certain advantages are attained as hereinafter set forth.

The spindle 2, passes outwardly through and snugly fits and turns in an opening in the end wall 15" of the casing 15, and is mounted in a journal box $15^a$, beyond the outer end of said casing.

If so desired, the lower half of the journal box $15^a$ can be formed integral with casing 15, and the outer lower portion of the casing can be flanged, see $15^b$, to fit on the top edge and outer vertical face of the head block 12, and be bolted thereto. We show the casting thus provided formed with a vertical oil off-take passage $15^c$, between the journal box $15^a$, and the casing end wall 15" to prevent oil working along the casting into the grain passage within the casing. An important advantage is thus attained by preventing passage of lubricant from journal box $15^c$, into the grain passage. In connection with this arrangement of casing 15, and worm or screw, it will be noted that when the clamping bolts 13, are removed, the section $b$, carrying the bed bur can be moved rearwardly from the mill, as the journal box $15^a$, will slip longitudinally from the rear end of the spindle, and the casing 15, will slip longitudinally from the worm and spindle, and said removable section can be as readily applied to the parts and secured in operative position, all without disturbing the fixed section $a$, the runner bur, and other fixed or operative parts of the mill.

The spindle 2, extends centrally and longitudinally through the runner bur A, and is fixed thereto in any suitable manner. For instance, we show said bur formed with an enlarged eye having lateral recesses at its outer end. A sleeve 16, is fixed on the shaft within the eye of the bur and is formed with radial wings extending into said recesses. The bur is then locked to the shaft by molten Babbitt or other suitable metal 16', completely filling the eye and its recesses around the shaft and sleeve and its wings, although of course we do not wish to limit ourselves to this manner of locking the runner bur to its spindle.

The bur A, runs freely in its casing section $a$, and is spaced from the end wall thereof to allow for ample longitudinal adjustment to and from the bed bur and to and from operative grinding position.

An annular space or passage $a''$, is formed within the casing section $a$, and around the circumference of the runner bur and the meal discharge space from between the two burs. The meal is discharged circumferentially from the burs into this annular space and is driven therefrom by the movement of the air set up by the rapid rotation of the runner bur through discharge spout 17, to the exterior of the casing. The discharge spout extends about tangentially from the upper part of the annular space $a''$ and the meal is blown or discharged thereinto from space $a''$, with great speed and rapidity. The runner bur is also cooled by the rapid circulation of air thereround. If so desired a plentiful supply of air can be provided to maintain this air cooling circulation through one or more screened air inlets, such as $a^3$. Also, this meal discharging and bur cooling air blast and circulation can be increased by one or more radial vanes $a^4$, projecting into space $a''$ from the inner end portion of the circumference of the runner burr. This vane can be carried by a metal band secured circumferentially around the inner end of the bur.

Figures 3, 7, 9:
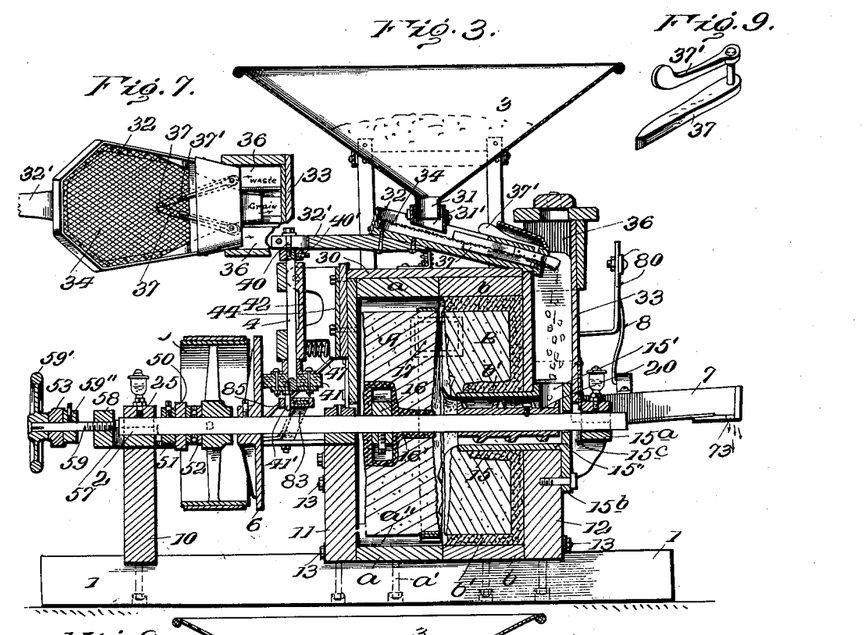
Fig. 3, is a central vertical longitudinal section thereof.
Fig. 7, is a detail top plan view of the feed shoe, showing the trunk, that receives the material from said shoe, in cross section.
Fig. 9, is a detail perspective of one of the adjustable gates or deflectors of said shoe.
Figures 4, 8:
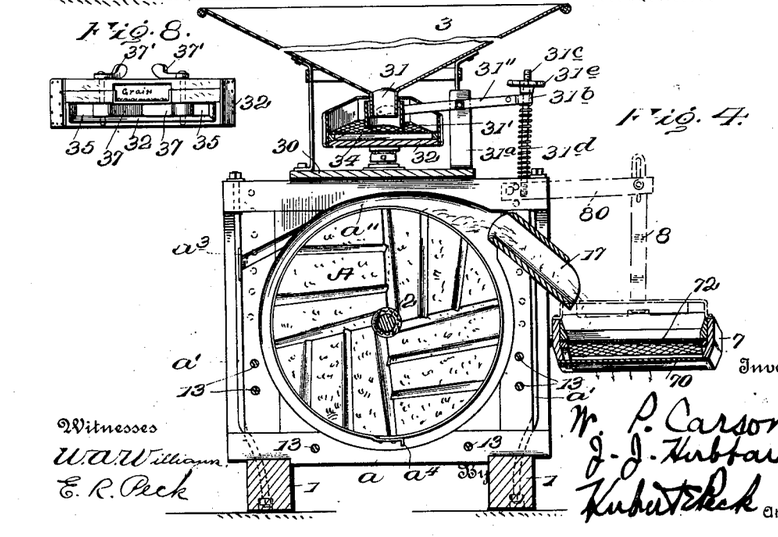
Fig. 4, is a vertical cross section thereof.
Fig. 8, is a detail cross section of said shoe.
Figures 10, 11:
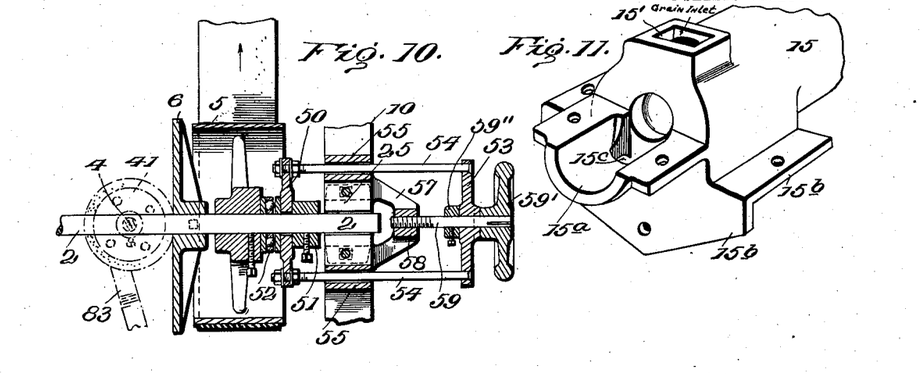
Fig. 10, is a horizontal detail cross section of the bur adjusting mechanism, and adjacent parts, for controlling the longitudinal position of the shaft or spindle and consequently the relative positions of the burs, and for throwing the shoe and screen actuating devices into and from action.
Fig. 11, is a detail perspective view of the casting forming the screen conveyer casing, said casting being fitted to and within the base stone or bur.
Figures 12, 13, 14:
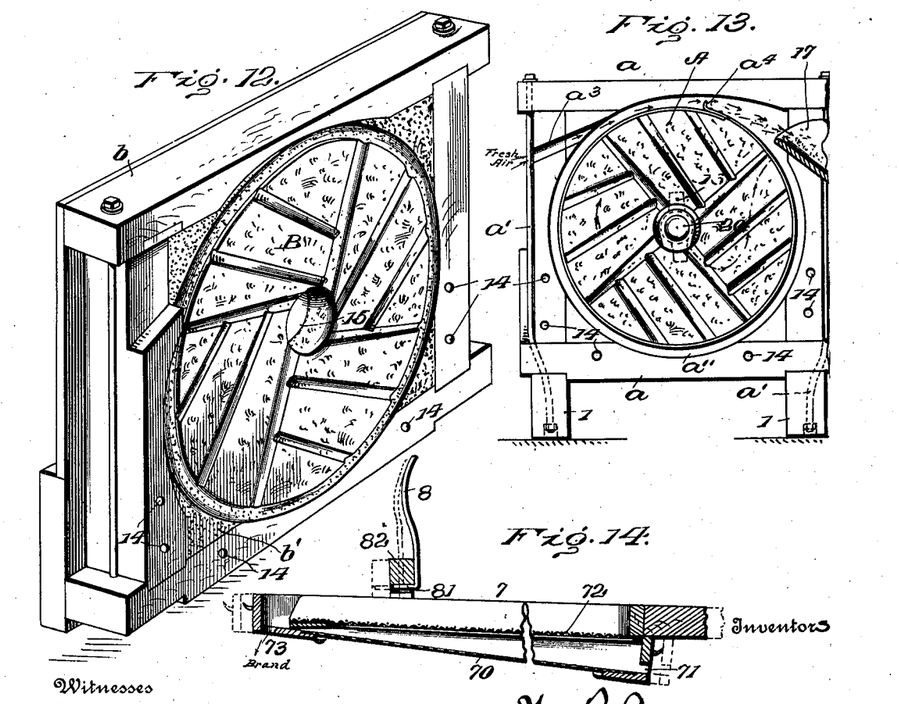
Fig. 12, is a detail perspective of the base stone or bur and its carrying frame.
Fig. 13, is a face view of the runner bur or stone and its casing or frame, the screw conveyer showing in end elevation.
Fig. 14, is a detail longitudinal sectional view of the meal shaker or screen and a spring thereof.

In the specific example illustrated, we show an elevated hopper 3, to receive the grain or other material to be ground, carried by suitable legs or supports rising from and secured to a base plate 30, horizontally arranged on top of the casing formed by sections $a, b$, but preferably not fixed to removable section $b$. This hopper is formed with a depending discharge spout 31, having its lower open end located a distance above the base plate 30, so that a vibrating grain feeding shoe 32, can be interposed between said plate and the spout to receive the grain therefrom and feed and deliver the same into the upper end of a vertical chute or trunk 33, through which the grain drops into the receiving opening 15', of the screw conveyer casing and onto the screw therein. The shoe 32, is longitudinally inclined downwardly toward its discharge end and is provided with a longitudinal screen 34, spaced above the bottom floor of the shoe and adapted to receive the grain and deliver the same over the delivery mouth of the shoe, which projects rearwardly into the trunk 33. Dirt and foreign matter drop through said screen onto the floor of the shoe and are thereby separated from the grain and discharged through side passages 35, (see Fig. 18) of the shoe into waste offtake passages 36, of the trunk 33. Pivoted gates 37, are arranged on the floor of the shoe to form said side passages 35 and to deflect the waste or dirt from the central vertical grain receiving passage of the trunk and into the side waste receiving passages 36, thereof. These gates are shown in this position in Fig. 7. These gates are provided with elevated operating handles or levers 37', by which the gates can be swung in opposite directions to close the side passages 36, and cause delivery of material on the floor of the shoe into the central grain receiving passage of the trunk with the material passing down on the upper surface of the screen. This adjustment is desirable where certain kinds of grain or other material are to be handled, as for instance, where the grain to be operated on is thoroughly clean or is so small as to fall through the screen.

The shoe is supported in the inclined position and is vibrated by a forwardly extending arm 32', rigid therewith and at its free end receiving a vertical crank or eccentric pin 40, on the upper end of a vertical rotary shaft 4.

The flow of grain from the hopper spout 31, to the shoe is regulated by a vertically adjustable sleeve 31', loosely surrounding said spout and depending therefrom approximately to the surface of the shoe screen. This regulating sleeve or cylindrical gate is carried by a vertically swinging regulating lever 31'' fulcrumed intermediate its ends to a suitable support $31^a$. The outer end of this lever is formed with an eye or fork $31^b$, vertically movable on a fixed longitudinally threaded vertical rod or post $31^c$, and is held by coiled spring $31^d$, on said rod, up against regulating nut $31^e$, vertically adjustable on said rod. By screwing said nut down on the rod, the lever will be swung to elevate the regulating sleeve and thereby increase the flow of grain into the shoe, while by elevating the regulating nut the feed of grain will be reduced or entirely stopped. The feed is determined by the distance between the lower edge of the regulating sleeve and the surface of the screen shoe. An exceedingly simple, durable and efficient feed regulator is thus provided.

The rear lower or discharge end of the feed shoe projects rearwardly into the vertical trunk 33, through a front opening in the projecting upper end thereof. This trunk consists of a vertical box arranged at the rear end of the casing section $b$, with its lower end fitting on the projecting rear end of the screw conveyer casing 15, and with the neck surrounding grain inlet opening 15', of said casing, fitting up in the central grain passage or chute of the trunk so that the grain will drop from the shoe through said passage and into said casing. The vertical side waste passages 36, of the trunk are open at their lower ends and discharge at opposite sides of the outer end portion of casing 15. This trunk can be removably arranged at the rear end or side of removable section $b$, so that it can be lifted from casing 15, when section $b$, is to be removed; or it can be fixed to said section and be removed therewith, slipping from the lower end of the shoe.

The driving power can be applied to the spindle 2, in any suitable manner and through any suitable means, although in the example illustrated a drive pulley 5, is fixed on the spindle adjacent to the spindle journal box 25, on head block 10, and through which the rotary spindle is longitudinally movable in effecting the adjustments hereinafter described.

Mechanism is provided for longitudinally adjusting the spindle to throw the burs to and from grinding relation and to vary the position thereof according to the material to be ground or the desired character or degree of fineness of the meal. This regulating or adjusting mechanism consists of a cross head 50, loosely arranged on the spindle between thrust collar 51, fixed on the spindle, and thrust bearing 52, interposed between said cross head and the hub of the drive pulley 5. The opposite ends of this cross head are fixed to the corresponding ends of another cross head 53, by rigid parallel longitudinal rods 54, confined in and longitudinally slidable through parallel guides 55. These guides preferably rise from and are fixed to or formed integral with a rigid open or rectangular metal frame 56, extending between and secured on the head blocks 10, 11, and carrying the spindle journal boxes arranged above said blocks. The bases of the braces 15, for the casing section *a*, are also fixed to said rigid frame. This rigid frame is of importance in maintaining parts fixed thereto and carried thereby properly spaced and in alinement. The journal box 25, is arranged between the guides 55.

57, is a rigid yoke fixed to or integral with said frame and projecting outwardly therefrom and carrying a fixed nut 58, in alinement with the longitudinal axis of the spindle and spaced outwardly beyond the end of said spindle. An outwardly extending adjusting screw 59, enters said nut and is longitudinally adjustable therein. This screw is provided at its outer end with a hand wheel 59', fixed thereto. The outer end portion of the screw passes loosely through and is turnable in the center of the cross head 53, said cross head being confined between the hub of the hand wheel and a thrust collar 59". The cross heads 50, 53, fixed together by rods 54, constitute a sliding yoke through and by which the spindle is moved longitudinally with the parts attached thereto, and this yoke is moved and held in the desired longitudinal position by the screw 59, and its fixed nut 58.

When the hand wheel 59' is turned in one direction the spindle will be moved to carry the runner bur toward the bed bur and produce meal of any desired degree of fineness. When the hand wheel is rotated in the opposite direction, the spindle will be moved to carry the runner bur out of operative relation with respect to the bed bur and from grinding position. The runner bur can be thus quickly and easily moved to and from operative grinding position, and can be accurately and readily adjusted to produce meal of the desired fineness. The mechanism is simple, durable and efficient.

Mechanism is also provided for operating the feed shoe and the meal shaker from the spindle and whereby said shoe and shaker will be thrown out of action, and out of operative connection with the spindle, when the spindle is adjusted to throw the runner bur from operative or grinding position. For instance, a vertically disposed rotary friction driving disk 6 is fixed on the spindle within the frame 56. This disk has a vertical rotating friction driving side face, and the vertical shaft 4, is provided with a friction pinion 41, fixed thereto and normally held to the friction driving face of said disk under tension or under sufficient pressure to cause the disk to drive the pinion and its shaft at a high rate of speed. The friction pinion or wheel is so arranged with respect to the disk, that when the spindle is moved to throw the runner bur from operative grinding position, said friction disk will move from power transmitting engagement with said friction wheel or pinion and thereby throw the shaft 4, out of action.

The friction wheel or pinion 41, can be of any suitable construction or formation, although in the example illustrated, we show the same composed of flexible disks tightly clamped between metal end heads.

The vertical shaft 4, is mounted to revolve in and is carried by a vertically arranged block or frame 42, and is usually held against dropping therefrom by a crank disk or collar 40' on the projecting upper end of the shaft and carrying the crank pin 40. The projecting lower end of the shaft carries the friction wheel 41, and a crank pin 41', depending from the under face of the wheel for actuating the meal screen or shaker as hereinafter set forth. The shaft carrying frame is mounted to swing vertically to carry the friction wheel toward and from the face of the vertical friction disk, the frame being hung from its upper end on a transverse or horizontal axis. For instance, we show opposite alined horizontal pivot screws or bolts 43, engaging the upper end of and for carrying the frame 42, and forming the axis on which the same rocks. The frame 42 is carried by and arranged between the vertical outwardly extending parallel flanges of a metal bracket 44, U-shaped in cross section and bolted or otherwise secured to the vertical outer wall of the casing section *a*, with the pivot bolts 43, extending and adjustable through the upper portions of said flanges (see Fig. 6).

The lower end of the frame 42, and the wheel 41, are held yieldingly toward the friction disk by a suitable spring mechanism. For instance, we show horizontal threaded bolts 45, rigid with the lower end of the bracket 44, and projecting outwardly and extending loosely through eyes 46, rigid with and extending laterally from the lower end of frame 42, so that the eyes can move longitudinally of said bolts. Expansion coiled springs 47 are arranged on said bolts and compressed between the bracket and said eyes to press the lower end of the frame outwardly and hold the wheel under the desired tension against the disk. The outward swing of frame 42 and the movement of the friction wheel toward the disk, are limited by nuts 48, on the outer ends of said bolts to form stops engaging said eyes. These nuts are adjustable on the bolts so that the path of outward movement of the frame 42, can be increased as the wheel 41, wears. The limit of movement of the friction wheel 41, toward the friction disk, can be accurately adjusted so that the friction wheel and shaft 4, driven thereby, will be simultaneously thrown out of action with the movement of the runner bur from operative position.

An elongated longitudinally movable or vibratory shaker 7, is arranged horizontally in front of the mill casing below the discharge spout 17, to receive the ground material discharged therefrom and to separate the bran from the meal and to deliver the bran and meal from separate discharge openings or outlets. This shaker consists of a suitable elongated open-top trough or casing having a bottom floor 70, to receive the meal and discharge the same through outlet 71, at one end of the shaker. If so desired, hooks or other means can be provided at said end of the shaker to hold a bag to receive the meal. The floor 70, preferably inclines longitudinally and downwardly toward the discharge 71. Above the floor 70, is arranged a longitudinal screen 72, longitudinally inclined in the same direction as floor 70, and at its upper end leading to bran discharge 73, at the opposite end of the shaker from meal discharge 71. The material from the spout 17, drops onto the screen and the bran is separated from the meal and discharged at 73, where a bag can be hung to receive the same, while the meal drops onto floor 70, and is discharged as described.

Figure 1:
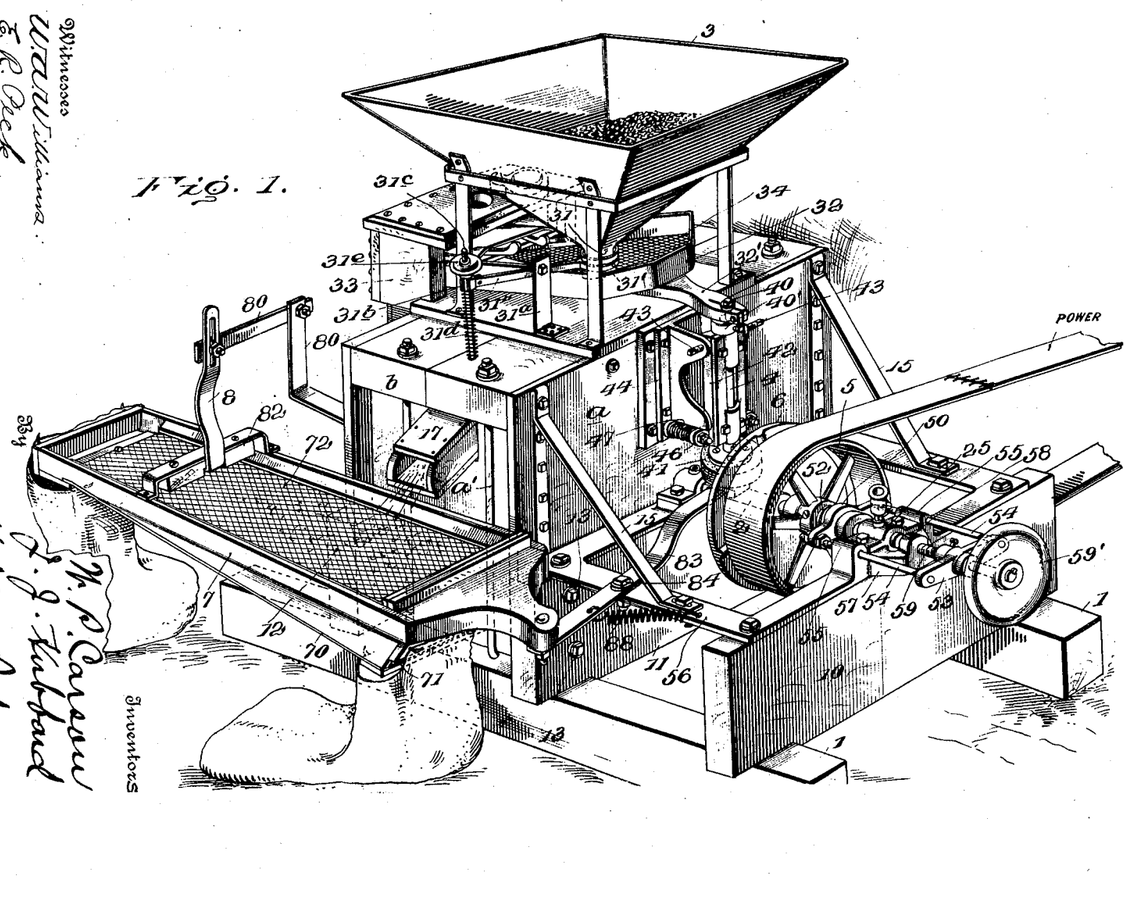
—Figure 1, is a perspective view of the complete mill.
Figures 2, 5, 6:
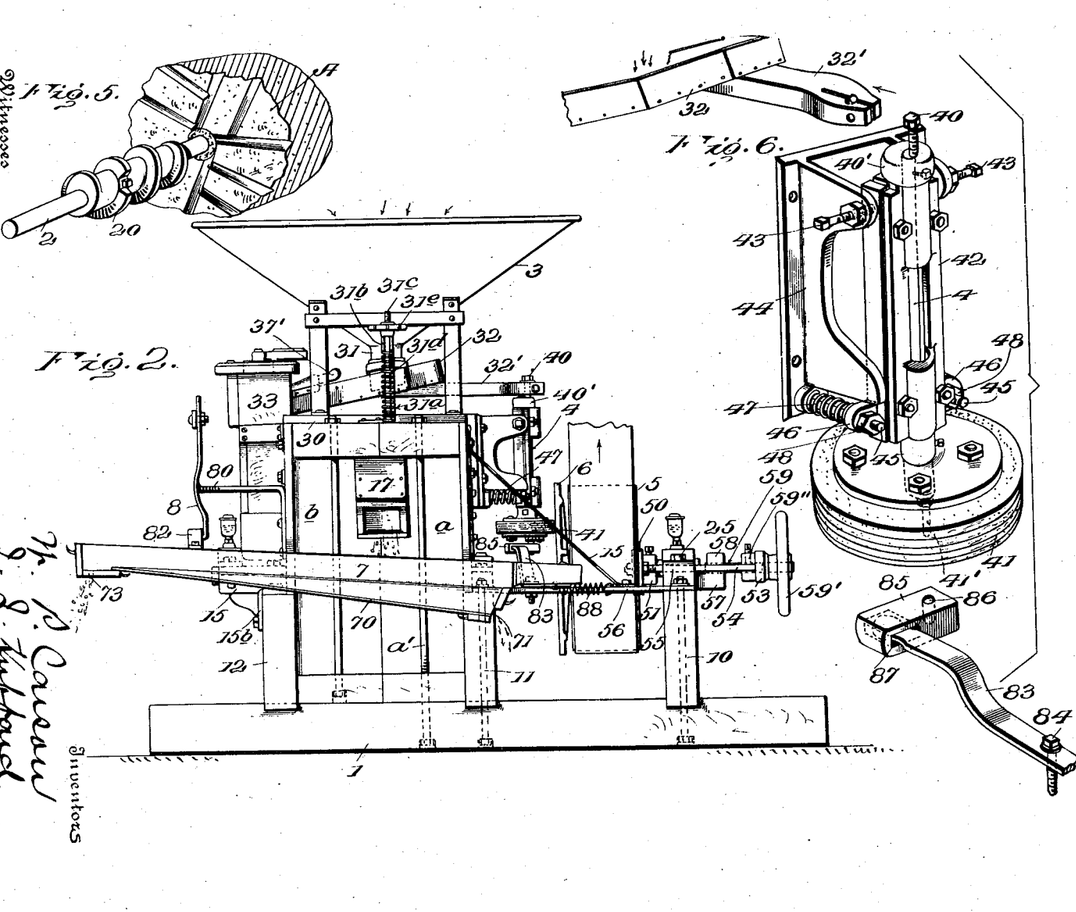
Fig. 2, is an elevation thereof.
Fig. 5, is a detail perspective of a portion of the runner bur or stone, the shaft or spindle, and the screw or conveyer thereon for forcing the grain to and between the burs.
Fig. 6, is a detail perspective view of parts of the mechanism for actuating the feed shoe and the meal and bran separating screen or shaker, certain of said parts being separated from the operating connections therefor.

By means of suitable mechanism a variable or differential longitudinal movement or vibration is imparted to the shaker of such a character as to feed the bran uphill, that is, longitudinally and upwardly along the screen 72, to the discharge at the upper end thereof, while the meal travels down the floor 70, to the discharge at the lower end thereof. Material advantages are attained by thus thoroughly agitating and scattering and slowly feeding the material from the spout 17, along the screen 72, as all of the meal is thereby most thoroughly and efficiently separated from the bran before the bran reaches the discharge 73. This slow feeding action of the ground material toward the upper or discharge end of the screen, is accomplished by vibrating the shaker more rapidly in one direction than in the other. For instance, the shaker is moved at excessive speed or with a jump toward the right (Fig. 2), i. e. the meal discharge end, and more slowly in the opposite direction. The jump or movement toward the right is so rapid that the screen moves under the material thereon. In other words, the screen advances more rapidly than the material thereon so that when the screen reaches its limit of rapid movement, the material thereon has been scattered, agitated and spread out, and as a mass is nearer the bran outlet than when said rapid movement started. Various actuating devices can be provided to thus operate the shaker. In the example illustrated, we show the shaker upheld at its free end by a vertically disposed plate spring 8, at its upper end adjustably secured to a supporting bracket 80, fixed to the mill casing and having its lower free end 81, bent at right angles and loosely caught under an elevated cross bar 82, fixed to the shaker. This spring is arranged to exert its tension in resisting longitudinal movement of the shaker toward the right (Figs. 1 and 2). The opposite end of the shaker is pivotally joined to the outer end of a horizontal rocking lever 83, and is upheld thereby. This lever is supported by the rigid frame 56, and is mounted to rock on a vertical fulcrum 84, arranged between the ends of the lever. The opposite or inner end of said rocking lever carries a metal block 85, near one end having a vertical perforation 86, (Fig. 6) loosely receiving the depending crank pin 41' at the lower end of vertical shaft 4. Near its opposite end, the block is formed with a transverse slot or socket 87, loosely receiving said inner end of the lever so that the block can to a limited extent rock horizontally on the lever and also slide longitudinally thereof.

A heavy coiled spring 88, is applied to the lever 83, and (for instance) to the frame 56, for exerting its tension in resisting movement of the shaker to the left and opposing the tension of spring 8. The power or tension of spring 88, is in excess of that of spring 8, and spring 88 imparts the quick jump or rapid feeding stroke to the shaker, which quick movement or jump is permitted by the loose connection or coupling between the lever 83, and the crank pin 41", through the medium of the removable block 85.

The rocking lever is oscillated to longitudinally vibrate the shaker by the rapid rotation of the shaft 4, through the medium of the eccentric connection established by block 85, and crank pin 41'.

The capacity of the mill is greatly increased by the action of the worm or screw conveyer 20, in constantly and forcibly feeding the grain into the grain receiving space between the burs and in forcing or pressing the grain through the bed bur and directly against the runner bur. We also find that the grinding action of the burs is improved and a superior quality of meal is produced by thus constantly forcing the grain into the space between the burs and directly against the runner bur.

Advantages are attained by providing actuating devices for the feed shoe and shaker that are automatically thrown out of gear or operating connection by the act of moving the runner bur from operative position, as will be readily understood by those skilled in the art.

It is considered needless to herein go into a detailed explanation of the various new results and advantages attained by many of the various arrangements, combinations and constructions disclosed, as those skilled in the art will readily appreciate the defects overcome by and the advantages of the various features of our invention.

We reserve the right to file separate application for patent devoted to the peculiarly advantageous bur or stone dress disclosed hereby and we waive no rights thereto by not claiming this separate invention herein.

It is evident that various changes, modifications and variations might be resorted to, that elements might be omitted, and features added, without departing from the spirit and scope of our invention, and hence we do not wish to limit ourselves to the specific example illustrated but consider ourselves entitled to all such departures as fall within the spirit and scope of our invention.

Desiring to protect and cover our invention as broadly as it is legally possible, what we claim is:—

1. In a grist mill, in combination, coöperating burs, a rotary spindle, a friction disk fixed on said spindle and having a side driving face, a shaft, a movable member actuated by said shaft, and a friction wheel on and driving said shaft and normally in engagement with and driven by said driving face of said disk, and means for adjusting said spindle longitudinally to throw said burs into and from grinding relation and said disk into and from driving relation with respect to said wheel.

2. In a grist mill or the like, the combination of a frame, coöperating burs, a longitudinally adjustable rotary spindle carrying one of said burs, means for adjusting said spindle longitudinally to move said bur to and from grinding position, mechanism for feeding material to be ground to said burs comprising a movable member, and actuating means for said movable member driven by said spindle and comprising mechanism whereby the operative connection between said member and said spindle is thrown into and out of gear by the longitudinal movement of said spindle in moving the bur carried thereby to and from grinding position.

3. In a grist mill or the like, the combination of a frame, coöperating burs, a longitudinally adjustable rotary spindle carrying one of said burs, means for adjusting said spindle longitudinally to move said bur to and from grinding position, mechanism for feeding the material to be ground to said burs comprising a movable member, a shaker to receive the ground material from said burs, operating connections for said movable member and for said shaker, and driving means therefor from the spindle, said driving means being thrown into and out of operative connection with the spindle by the longitudinal movement thereof in carrying the bur secured thereto to and from grinding position.

4. In a grist mill or the like, comprising coöperating burs, the combination of a rotary longitudinally adjustable spindle, means for adjusting said spindle to throw the burs into and from grinding relation, a friction disk rotating and movable longitudinally with said spindle, a movable member, a rotary shaft for actuating said member, said shaft being transversely arranged with respect to said spindle and being yieldingly held laterally toward said friction disk and having a friction wheel normally engaging the friction driving side face of said disk and driven thereby to actuate said shaft, and means whereby said wheel is limited against moving into operative engagement with said side face when said spindle is adjusted to throw said burs from operative grinding relation.

5. In a grist mill or the like, comprising coöperating burs, a rotary driving spindle, a casing, and feed mechanism, the combination of a vertically disposed rotary disk having a vertical friction driving surface, a vertical shaft actuating said feed mechanism and having a friction wheel normally in friction driven relation with said surface, a rockable frame mounted on a transverse axis and carrying said shaft, a spring mechanism acting on said frame to hold said wheel against said driving surface, and means limiting the swing of said rockable frame toward said friction surface.

6. In a grist mill or the like, a horizontally disposed rotary spindle, a friction disk fixed thereto and rotating therewith, a fixed bracket, a shaft arranged about radially of said spindle and provided with a friction wheel in normal operative engagement with said disk, a frame carrying said shaft and rockable toward and from said disk and mounted in said bracket in a transverse axis, spring mechanism yieldingly holding said frame toward said disk, and adjustable stop mechanism for said frame, said shaft adapted to have operative vibrating connection with a feed shoe and with a shaker.

7. In a grist mill, or the like, in combination, a casing, grinding elements, a spindle for operating the same, feed mechanism, a shaker for receiving the ground material from said grinding elements, a disk driven by said spindle and having a friction driving side face, a shaft arranged approximately radially with respect to said spindle and connected to actuate said feed mechanism and said shaker, and a friction wheel on and driving said shaft and normally yieldingly held in engagement with and driven by said friction side face.

8. In a grist mill, in combination, a runner bur, a coöperating bur, said runner bur being adjustable toward and from said coöperating bur, a rotary disk having a side friction driving face, a shaft having a friction wheel normally held to and rotated by said friction face, said wheel and disk being relatively movable to and from operative driving relation, a movable member operatively connected with and actuated by said shaft, actuating means for rotating said disk and said runner bur, and manually actuated means controlling the relative operative positions of said wheel and disk and of said burs.

9. In a grist mill, in combination, coöperating burs, a rotary longitudinally movable bur-operating spindle whereby the burs can be thrown into and from operative grinding relation, manually controlled means for longitudinally adjusting said spindle, a disk rotated by and longitudinally movable with said spindle and having a friction driving side face, a friction wheel normally and yieldingly held to and driven by said face, means limiting movement of said wheel toward said face, a movable member, and actuating connections from said wheel to said member.

10. In a grist mill or the like, comprising coöperating burs, a rotary driving spindle, a casing, and feed mechanism, the combination of a vertically disposed rotary disk having a vertical friction driving surface, a vertical feed-mechanism-operating shaft having a friction wheel normally in friction driven relation with said surface, a rockable frame mounted on a transverse axis and carrying said shaft, spring mechanism acting on said frame to hold said wheel against said driving surface, means limiting the swing of said rockable frame toward said friction surface, said spindle being longitudinally movable to throw said burs into and from grinding relation and to move said disk to and from driving relation with respect to said wheel, and manually actuated means for adjusting said spindle longitudinally.

11. In a grist mill, in combination, a casing, a pair of coöperating grinding burs adjustable to and from operative grinding relation, feed mechanism, driving means comprising a disk having a friction driving side face, actuating means therefrom for operating said feed mechanism comprising a radially-arranged rotary shaft having a friction wheel arranged beside and normally held in operative engagement with and driven by said disk friction face, and adjusting means for throwing said wheel and disk into and from operative driving engagement.

12. In combination, in a grinding mill, a frame, vertically disposed grinding burs, a rotary spindle horizontally disposed and provided with driving means, feed mechanism, a rotary disk having a vertical friction driving side face, a vertically disposed feed-mechanism-operating shaft having a friction driving wheel, a vertically rockable support for said shaft yieldingly held toward said disk to normally maintain said wheel in operative contact with said side face, and means for moving said disk to and from operative driving position with respect to said wheel and for adjusting said burs to and from grinding relation.

13. In a grist mill, or the like, in combination, a casing, grinding means, a spindle for operating said means and for throwing the same into and from grinding adjustment, a movable member, a friction disk fixed on said spindle at the exterior of said casing, a shaft arranged at the exterior of said casing and provided with a friction wheel normally and yieldingly held engaging and driven by said disk, actuating connections from said shaft to said member, and means for adjusting said spindle to throw said grinding means to and from operative position and said disk to and from said wheel.

14. In a grist mill, in combination, a casing, a vertical bed bur having an eye, a casting forming a sleeve at its outer end having a top opening and a vertical end wall and a journal box bracket beyond and spaced from said end wall and forming an intervening vertical opening, said casting being fixed on the casing with said sleeve extending horizontally therefrom into said eye, said bracket being provided with a journal box at the exterior of the casing, a horizontal rotary spindle mounted in said box and passing through said wall and sleeve, and a runner bur mounted on said spindle.

15. In combination, in a grist mill, a casing, a vertical runner bur therein, a vertical bed bur fixed in and to the casing and having an eye, a sleeve arranged in said eye and extending to the exterior of the casing and rigidly secured thereto, and at its outer end having a top inlet, said sleeve formed with an exterior bracket provided with a journal box, and a horizontal spindle mounted in said box and carrying said runner bur.

In testimony whereof we affix our signatures, in presence of two witnesses.

WILFRED P. CARSON.
JOHN J. HUBBARD.

Witnesses:
W. C. MEADOWS,
E. C. CONNER.